United States Patent [19]

Goldman et al.

[11] 3,886,266
[45] May 27, 1975

[54] DENTAL TREATMENT

[75] Inventors: Melvin Goldman, Worcester; Joseph H. Kronman, Sharon, both of Mass.

[73] Assignee: National Patent Development Corporation, New York, N.Y.

[22] Filed: Nov. 20, 1972

[21] Appl. No.: 307,835

Related U.S. Application Data

[63] Continuation-in-part of Ser. No. 117,822, Feb. 22, 1971, abandoned, and a continuation-in-part of Ser. No. 197,966, Nov. 11, 1971, abandoned.

[52] U.S. Cl. ................................ 424/53; 424/54
[51] Int. Cl. ............................... A61k 7/16
[58] Field of Search ................. 424/53, 54

[56] References Cited
UNITED STATES PATENTS

| | | | |
|---|---|---|---|
| 1,435,498 | 11/1922 | Resnik et al. | 424/53 |
| 2,506,630 | 5/1950 | Bruce | 23/86 |
| 3,590,121 | 6/1971 | Schiff et al. | 424/50 |

FOREIGN PATENTS OR APPLICATIONS

| | | | |
|---|---|---|---|
| 552,803 | 4/1943 | United Kingdom | 424/53 |

OTHER PUBLICATIONS

*Chemical Abstracts*, Vol. 13, p. 2105, 1919.
Shih et al., *Oral. Surg.*, Vol. 29, pp. 613–619, Apr. 1970.
Norman, *Biochem. J.*, Vol. 30, pp. 484–496, 1936.

*Primary Examiner*—Richard L. Huff
*Attorney, Agent, or Firm*—Cushman, Darby & Cushman

[57] ABSTRACT

N-monochloroglycine at a pH of 9 to 11.5 is effective both in solution and as a paste to dissolve dental plaque and dental caries, without adversely affecting hard healthy dental structures.

32 Claims, No Drawings

DENTAL TREATMENT

This application is a continuation-in-part of application Ser. No. 117,822, filed Feb. 22, 1971, now abandoned and application Ser. No. 197,966, filed Nov. 11, 1971 and now abandoned.

In our parent applications we stated that ordinary sodium hypochlorite solutions at, and preferably buffered at a pH of between about 9 and 11, are remarkably effective for removing plaque. Solutions at concentrations of sodium hypochlorite between 0.25 – 1.5% by weight were found suitable although higher concentrations are also effective, e.g., 5.25%, and not generally harmful.

It was further found that the pH can be as high as 11.5, preferably 11.1 to 11.4. The optimum concentration is 0.05 to 0.1% by weight. At a concentration of 0.1% sodium hypochlorite buffered with glycine dissolves plaque rapidly, caries taking somewhat longer to be removed. In fact, concentrations as low as 0.03% or even 0.01% are effective to some extent in dissolving plaque and removing caries.

The present invention has the following objectives:
1. The removal of carious lesions.
2. The preparation of compositions clinically effective in preventing caries by removing insipient caries as it forms.
3. The preparation of compositions which dissolve plaque.
4. As a result of dissolving plaque the compositions of the invention prevent the development or buildup of calculus and/or caries.

The use of sodium hypochlorite in dental preparation has been proposed in the past, see, e.g., U.S. Pat. No. 1,435,498, but without recognition of the significance of maintaining the pH between about 9 and 11 or 11.5.

Our parent cases also pointed out that in place of sodium hypochlorite, there can be used potassium hypochlorite or calcium hypochlorite. In the case of calcium hypochlorite, however, higher concentrations are required for equal effectiveness. Thus, a solution of 5% calcium hypochlorite is required to give effectiveness comparable to 0.1% of sodium hypochlorite. It is critical to use the hypochlorites specified. Other halides are ineffective as are organic chlorides.

The use of aqueous sodium hypochlorite (or potassium hypochlorite or calcium hypochlorite) by itself has the problem that it attacks the mucous lining of the mouth and hence is not satisfactory for use with unextracted teeth.

In our parent application it is pointed out that glycine can be used as the buffer and that the preferred buffer is an aqueous mixture of glycine, sodium chloride and sodium hydroxide and that with this buffer there can be obtained any desired pH between 9 and 11.5. Reference was made to Pearse Histochemistry Theoretical and Applied (1968) Appendix 8, page 584 for such buffer. The disclosure of Pearse is hereby incorporated by reference.

It has now been found that the ability to remove caries and dissolve plaque is primarily due to the fact that N-monochloro glycine is formed in situ from the sodium hypochlorite (or potassium hypochlorite or calcium hypochlorite) and the glycine in the aqueous solution. N-monochloroglycine is a known material which is unstable, since it decomposes fairly rapidly.

It has further been found that on a molar basis the range of glycine to sodium hypochlorite should be from 1 : 1 to 15 : 1, preferably 7 : 1. (With potassium hypochlorite the molar ratio should be the same and with calcium hypochlorite there should be used twice as much glycine on a molar basis since each mole of calcium hypochlorite has two equivalents of hypochlorite.) By using at least as much glycine as hypochlorite on an equivalent basis (e.g., mole for mole with sodium hypochlorite) there is no excess hypochlorite, e.g. sodium hypochlorite, which can attack the mucous lining of the mouth. The N-chloroglycine with or without admixture with glycine does not have an adverse effect on such lining and as stated supra is effective in dissolving plaque and removing caries.

N-monochloroglycine, with or without excess glycine, is also useful in solid or paste dentifrices at a pH of 9 – 11.5, usually 9 – 11. An inert material such as silica can be used as a thickener.

The toothpaste can contain conventional additives such as abrasive materials, sudsing agents, binders, humectants, flavoring and sweetening materials.

The abrasives preferably should be relatively insoluble and stable at the pH ranges herein specified. They desirably should not be so abrasive as to scratch the surface of the teeth or unduly abrade the dentin, but they desirably should have just sufficient abrading power to clean the teeth. In the practice of this invention any dental abrasives can be used which have these abrasion properties.

Among the abrasives for use in the dentifrices of this invention there can be mentioned the insoluble condensed phosphates and the water-impervious, cross-linked, thermosetting resins. Examples of such insoluble condensed phosphates include calcium pyrophosphate, insoluble highly polymerized calcium polyphosphate - sometimes called calcium polymetaphosphate, and insoluble highly polymerized sodium polyphosphate - sometimes called insoluble sodium metaphosphate. Examples of operable resin abrasives are the particulate condensation products of formaldehyde with melamine and/or urea, and others fully described in U.S. Pat. No. 3,070,510, granted Dec. 25, 1962. Calcium carbonate can also be used. Also there can be employed mixtures of abrasives.

The total amount of abrasive materials in dentifrices of this invention can range from 0.5% to 95% of the dry weight of the dentifrice. Usually the toothpaste contain from 20% to 60% by weight.

Dentifrices conventionally contain sudsing agents. Any of the commonly used sudsing agents can be used if they are reasonably stable and form suds within the pH range of the compositions of this invention. Examples of suitable sudsing agents include, but are not limited to water-soluble salts of alkyl sulfates having from about 10 to 18 carbon atoms in the alkyl group such as sodium lauryl sulfate; water soluble salts of sulfonated monoglycerides of fatty acids having from about 10 to 13 carbon atoms, such as sodium coconut monoglyceride sulfonate; salts of fatty acid amides of taurine such as sodium-N-methyl-N-palmitoyl tauride; water soluble salts of higher fatty acids, e.g., sodium stearate, potassium stearate and substantially saturated aliphatic acyl amides of saturated aliphatic monoaminocarboxylic acids having 2 to 6 carbon atoms and in which the acyl radical contains 12 to 16 carbon atoms, such as sodium-N-lauroyl sarcoside. Mixtures of two or more sudsing agents can also be used.

Sudsing agents can be used in the compositions of this invention in an amount of from 0.5% to 5.0% of the dry weight of the composition.

In preparing toothpastes, it is desirable to add some thickening material. Thickening agents include water-soluble salts of cellulose ethers such as sodium carboxymethyl cellulose and sodium carboxymethyl hydroxymethyl cellulose, natural gums such as gum karaya, gum arabic, and gum tragacanth. Colloidal magnesium aluminum silicate and finely divided silica can also be used as thickening agents for improvement in texture. Thickening agents in an amount of from 0.1% to 5.0% of the dry weight of toothpaste, can be used to form a satisfactory toothpaste.

Suitable humectants include glycerine, sorbitol, mannitol and other polyhydric alcohols. The humectants may comprise up to about 35% of the dry weight of the toothpaste composition.

Small amounts of flavorings, such as oil of wintergreen, oil of peppermint, oil of spearmint, oil of sassafras, and oil of anise can be added to the compositions of the invention as can sweetening agents such as saccharin, dextrose and levulose. Preferably flavorings are not employed if they have an adverse effect on N-monochloroglycine.

Daily rinsing of the mouth and teeth with the N-monochloroglycine solution will dissolve plaque and prevent development of its hard end product calculus. The preferred solutions at 0.1–0.2% require less time than do other proportions.

It has further been found that the compositions of the invention are effective for removing caries preliminary to filling.

In treating a decayed tooth, it is only necessary to direct a jet of the N-monochloroglycine solution against the affected area, preferably with some mechanical scrubbing with a swab. A jet of N-monochloroglycine solution may be applied from an ordinary syringe or from a mechanical pumping mechanism such as the household device commercially sold as a Water Pic, a pulsating jet. The N-monochloroglycine solution is normally prepared just before use by mixing aqueous sodium hypochlorite with aqueous glycine.

The spraying time in some instances can be reduced by treatments preceding the spraying and/or there can be incorporated a mechanical scrubbing action or other physical action in conjunction with the chemical action of the solution.

EXAMPLE 1

A decayed tooth can be prepared for filling as follows:

An 0.5 percent by weight aqueous solution of sodium hypochlorite is first prepared. To this is added about 1 percent by weight of glycine hydrochloride and sufficient sodium hydroxide (from a 1 percent by weight solution) to bring the pH to about 10. This buffered solution may be applied at room temperature or higher (preferably at body temperature) to the carious area as a jet from a commercial Water Pic. The tooth will be substantially clean of caries after a few minutes (e.g., 2–10) application. It is then dried and may be filled with amalgam in the usual manner. The molar ratio of glycine to sodium hypochlorite in this example was about 1.35 to 1.

The benefits of this invention may also be realized by incorporating the N-monochloroglycine in common dental preparations such as toothpaste and mouthwash.

EXAMPLE 2

A typical mouthwash preparation suitable for use in the practice of this invention can be prepared from:

| | |
|---|---|
| sodium chloride | 2.0 grams |
| sodium bicarbonate | 1.0 grams |
| amaranth solution | 2.0 cc. |
| peppermint water, containing 0.5% by weight sodium hypochlorite, buffered to pH 11 with glycine | 240 cc. |

Daily rinsing of the mouth with this solution should eliminate calculus buildup.

EXAMPLE 3

A dentifrice suitable for use in the practice of this invention can be prepared from:

| | | |
|---|---|---|
| calcium carbonate (Snow Top Light) | 33.5 | grams |
| tricalcium phosphate (Victor) | 4.3 | grams |
| glycerite of starch | 31.40 | grams |
| magnesium hydroxide | 3.80 | grams |
| white neutral soap | 0.90 | grams |
| potassium soap | 0.73 | grams |
| gum tragacanth | 0.11 | grams |
| propylene glycol | 2.26 | grams |
| flavoring (e.g. oil of peppermint) | 0.80 | grams |
| distilled water, containing 1.5 percent by weight sodium hypochlorite buffered to pH 11 with glycine | 20.20 | grams |

Daily brushing of the teeth with the above should eliminate plaque, thereby preventing the incremental buildup of calculus.

EXAMPLE 4

There was prepared an aqueous buffer solution 0.05 molar in glycine, 0.05 molar in sodium hydroxide and 0.05 molar in sodium chloride. There was also employed 1 ml. of mint flavor (A-3660 of Haarmann and Reimer). The final hypochlorite mouthwash was made by placing 500 ml. of distilled water in a 1,000 ml. volumetric flask, adding the indicated amount of aqueous 5% of sodium hypochlorite solution and indicated amount of mixture of buffer and flavor (containing 1 ml. of flavor in each case). The flask was then made up to 1000 ml. The solutions prepared were as follows:

| Amount of NaOCl | | Concentration of NaOCl - In Product | Glycine | |
|---|---|---|---|---|
| (ml) | Moles | (%) | (ml) | Moles |
| 1 | .00067 | 0.05 | 98 | .0049 |
| 3 | .00201 | 0.15 | 96 | .0048 |

Unless otherwise indicated in the present specification and claims, all parts and percentages are by weight.

EXAMPLE 5

| Toothpaste Formulation | |
|---|---|
| glycerine | 47 parts |
| water | 7.3 |

-Continued

| | |
|---|---|
| saccharin (sodium salt) | 0.04 |
| precipitated chalk | 20.8 |
| magnesium carbonate | 13.3 |
| magnesium hydroxide | 4.2 |
| soap (powdered,neutral,white) | 0.85 |
| gum tragacanth powder | 0.76 |
| oil of peppermint | 0.4 parts |
| oil of anise | 0.08 |
| oil of spearmint | 0.08 |
| methyl salicylate | 0.08 |
| oil of caraway | 0.02 |
| distilled water containing 0.1% sodium hypochlorite buffered to pH 11.1 – 11.3 with glycine | 5 |

EXAMPLE 6

Toothpowder Formulation

| | |
|---|---|
| sodium chloride | 44 parts |
| sodium bicarbonate | 24 |
| calcium carbonate | 21.5 |
| tricalcium phosphate | 5 |
| potassium chloride | 3.5 |
| magnesium sulfate | 1.75 |
| oil of cinnamon | 0.1 |
| oil of cloves | 0.07 |
| methyl salicylate | 0.08 |
| distilled water containing 0.1% of sodium hypochlorite buffered to pH 11.2 with glycine | 5 |

It has also been found that the pH can be as low as 8 although the range of 9 to 11.5 and especially 10.5 to 11.5 is preferred.

The free glycine can range from 0 to 14 moles per mole of N-monochloroglycine.

Aqueous sodium hypochlorite in a range of 0.01 to 5.25% by weight forms an N-monochloroglycine solution of a molar range of 0.0013 to 0.7 when glycine is added in an amount of at least 1 mole per mole of the sodium hypochlorite. Similarly aqueous sodium hypochlorite in a range of 0.25 to 1.5% by weight forms an N-monochloroglycine solution of a molar range of 0.034 to 0.17 when glycine is added in an amount of at least 1 mole per mole of the sodium hypochlorite and aqueous sodium hypochlorite in a range of 0.05 to 0.2% by weight forms an N-monochloroglycine solution of a molar range of 0.0066 to 0.0264.

What is claimed is:

1. The method of treating teeth for the prevention of calculus comprising contacting the teeth with sufficient of an aqueous composition containing N-monochloroglycine at a pH of about 9 to 11.5 to accomplish said purpose.

2. The method of claim 1 wherein the pH is about 11.1 to 11.4.

3. The method of claim 1 wherein the pH is between about 9 and 11.

4. The method according to claim 3 wherein the aqueous composition has a molar concentration of N-monochloroglycine of 0.034 to 0.17.

5. The method of claim 1 wherein there is present free glycine in an amount up to 14 moles per mole of N-monochloroglycine.

6. The method of claim 4 wherein the aqueous composition has a molar concentration of N-monochloroglycine of 0.0013 to 0.7.

7. The method of claim 5 wherein the pH is 11.1 to 11.4.

8. The method of claim 7 wherein the aqueous composition has a molar concentration of N-monochloroglycine of 0.0066 to 0.0264.

9. The method of claim 1 wherein there is included the step of forming the N-monochloroglycine in situ from (1) hypochlorite selected from the group consisting of sodium hypochlorite, potassium hypochlorite, and calcium hypochlorite, and (2) glycine, prior to treating the teeth and then treating the teeth substantially as soon as the N-monochloroglycine is formed.

10. The method according to claim 9 wherein the aqueous composition is applied as a pulsating jet stream.

11. The method according to claim 9 wherein hypochlorite is sodium hypochlorite.

12. The method according to claim 11 wherein the amount of sodium hypochlorite is from 0.1 to 1.5% by weight of the solution, and the amount of glycine is from 1.35 moles to 7.3 moles per mole of sodium hypochlorite.

13. The method of treating decayed teeth to remove caries comprising directing a stream of an alkaline aqueous solution of N-monochloroglycine against the carious area and continuing said stream against said area until the caries has been removed.

14. The method according to claim 13 wherein said stream is a pulsating jet.

15. The method of claim 13 wherein the N-chloroglycine solution contains up to 14 moles of glycine per mole of N-monochloroglycine.

16. The method of claim 15 wherein the solution has a pH between about 9 and 11.5.

17. The method of treating teeth to dissolve plaque thereon comprising contacting the teeth with an aqueous alkaline solution of N-monochloroglycine until the plaque is dissolved.

18. The method of claim 17 wherein the solution has a pH between about 9 and 11.5.

19. The method of claim 18 wherein the N-chloroglycine solution contains up to 14 moles of glycine per mole of N-monochloroglycine.

20. The method of claim 19 wherein the solution consists essentially of water containing glycine and N-chloroglycine in the molar ratio of 6 to 1.

21. The method of treating teeth for the purpose of removal of caries comprising contacting the teeth with sufficient of an aqueous composition containing N-monochloroglycine at a pH of about 9 to 11.5 to accomplish said purpose.

22. The method of claim 21 wherein the Ph is about 11.1 to 11.4.

23. The method of claim 21 wherein the pH is between about 9 and 11.

24. The method according to claim 23 wherein the aqueous composition has a molar concentration of N-monochloroglycine of 0.034 to 0.17.

25. The method of claim 21 wherein there is present free glycine in an amount up to 14 moles per mole of N-monochloroglycine.

26. The method of claim 25 wherein the aqueous composition has a molar concentration of N-monochloroglycine of 0.0013 to 0.7.

27. The method of claim 25 wherein the pH is 11.1 to 11.4.

28. The method of claim 27 wherein the aqueous composition has a molar concentration of N-monochloroglycine of 0.0066 to 0.0264.

29. The method of claim 21 wherein there is included the step of forming the N-monochloroglycine in situ from (1) a hypochlorite selected from the group consisting of sodium hypochlorite, potassium hypochlorite, and calcium hypochlorite, and (2) glycine, prior to treating the teeth and then treating the teeth substantially as soon as the N-monochloroglycine is formed.

30. The method according to claim 29 wherein the aqueous composition is applied as a pulsating jet stream.

31. The method according to claim 29 wherein hypochlorite is sodium hypochlorite.

32. The method according to claim 31 wherein the amount of sodium hypochlorite is from 0.1 to 1.5% by weight of the solution, and the amount of glycine is from 1.35 moles to 7.3 moles per mole of sodium hypochlorite.

* * * * *